United States Patent [19]
Beaudet et al.

[11] Patent Number: 5,511,150
[45] Date of Patent: Apr. 23, 1996

[54] COPIER/PRINTER WITH IMPROVED PRODUCTIVITY

[75] Inventors: Douglas B. Beaudet, Rochester; David R. Hansen, Honeoye Falls; Michael P. Tompkins, Chili, all of N.Y.

[73] Assignee: Eastman Kodak Company, Rochester, N.Y.

[21] Appl. No.: 158,549

[22] Filed: Nov. 29, 1993

[51] Int. Cl.⁶ .................................................. G03G 15/01
[52] U.S. Cl. .................................................................. 395/113
[58] Field of Search ................................. 395/101, 104, 395/109, 112, 113, 163; 358/401, 300; 355/200, 300

[56] References Cited

U.S. PATENT DOCUMENTS

| | | | |
|---|---|---|---|
| 4,882,604 | 11/1989 | Kato et al. | 355/201 |
| 4,887,218 | 12/1989 | Natarajan | 364/468 |
| 4,947,345 | 8/1990 | Paradise et al. | 364/519 |
| 4,956,667 | 9/1990 | Gartner | 355/202 |
| 4,959,731 | 9/1990 | Fukae | 358/300 |
| 5,377,016 | 12/1994 | Kashiwagi et al. | |

FOREIGN PATENT DOCUMENTS

0499719A1  8/1992  European Pat. Off. .

*Primary Examiner*—Mark R. Powell
*Assistant Examiner*—Gabriel I. Garcia
*Attorney, Agent, or Firm*—Norman Rushefsky

[57] ABSTRACT

An electrophotographic copier/printer reproduction apparatus includes a marking engine that has a job image buffer (JIB) that queues jobs from a scanner and a raster image processor (RIP). The scanner supports the copier function of the apparatus and processes original documents by scanning the images thereon to form copier image data that is processed and stored in the JIB. The RIP processes printer data from a computer and transmits this data also to the JIB for further processing and storage. The RIP operates in two printer modes. In a first printer mode, data is sent to the JIB as it is RIPed and no provision is made for an interrupt for a copier job nor can a copy job be scanned in. This provides maximum efficiency for printer operation. In a second, less efficient, printer mode the JIB stores only a few and preferably one-print job at a time to leave room in the JIB for scanning in a copy job via an interrupt operation. A criterion for switching between the two printer modes is time of day, print job backlog or coding of a print job.

20 Claims, 12 Drawing Sheets

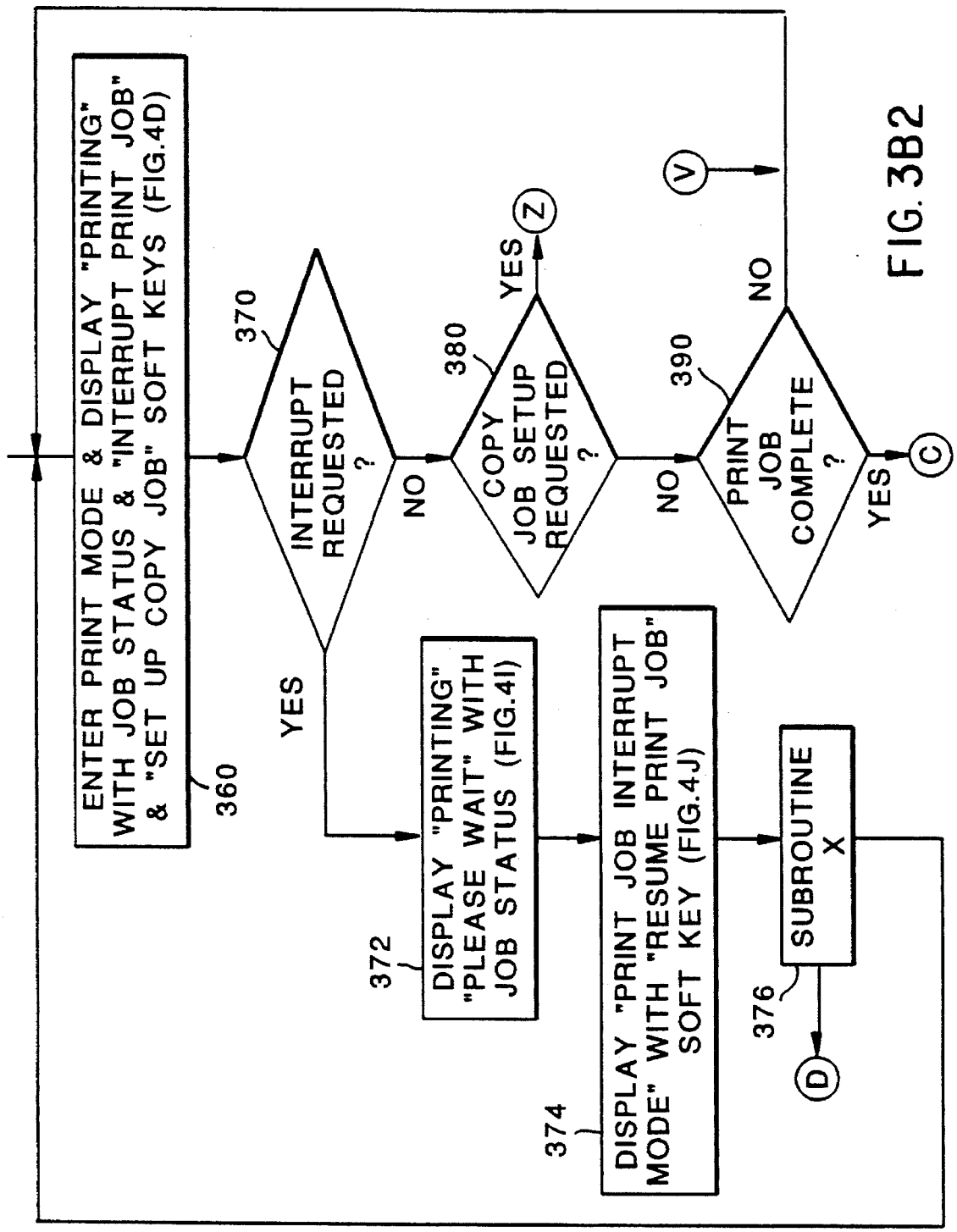
FIG. 3B2

COPIER PRINTER READY

*FIG. 4A*

COPIER READY

*FIG. 4B*

PRINT JOB LOADING
PRINT JOB: 1234
SET 1 OF 200

| INTERRUPT PRINT JOB | |

*FIG. 4C*

PRINTING
PRINT JOB: 1234
SET 124 OF 200
TIME REMAINING: 5 MINS 37 SECS

| INTERRUPT PRINT JOB | | SET UP COPY JOB |

*FIG. 4D*

```
COPY JOB SETUP-SELECT FEATURES ON
  CONTROL PANEL. PRESS START TO SCAN.
PRINTING JOB: 1234
SET 124 OF 200
TIME REMAINING: 5 MINS 37 SECS
```
| RESET SETUP | | CANCEL COPY JOB SETUP |
|---|---|---|

*FIG. 4E*

```
SCANNING
PRINTING JOB: 1234
SET 124 OF 200
TIME REMAINING: 5MINS 37 SECS
```

*FIG. 4F1*

```
PRINTING JOB: 1234
SET 124 OF 200
TIME REMAINING: 5MINS 37 SECS
COPY JOBS WAITING: 1
```
| | REVIEW COPY JOB SETUP |
|---|---|

*FIG. 4F2*

```
PRINTING JOB. 1234
MAKE JOB LEVEL CHANGES TO NEXT JOB
THEN PRESS<SAVE CHANGES> OR <NO CHANGES>
TO RETURN TO CURRENT JOB.
```
| SAVE CHANGES NEXT JOB | | NO CHANGES NEXT JOB |
|---|---|---|

*FIG. 4G*

COPIER/PRINTER WITH IMPROVED PRODUCTIVITY

BACKGROUND OF THE INVENTION

1. Field of the Invention

This invention relates generally to reproduction apparatus operable in both copier and printer modes such as, for example, electrophotographic copier/printers.

2. Background Art

In U.S. Pat. No. 5,105,283, description is provided of an electrophotographic reproduction apparatus that is operable in both copier and printer modes. As used herein, the term "copier" is meant to refer to apparatus arranged for reading the image information on an original document sheet and for reproducing such image information on a receiver or copy sheet, which is a "hard copy." The term "printer" is meant to refer to apparatus arranged for receiving image information in other than hard copy form, referred to as electronic form, and for reproducing such image information on a receiver sheet. The term "original" is meant to refer to image information to be reproduced, whether such image information is in hard copy, electronic or other form. The term "reproduction apparatus" is meant to refer to copiers and/or printers. The term "print job" is used in its conventional sense and implies operation of the apparatus in a printer mode to produce one or more hard copy sets of data in accordance with predetermined parameters requested for producing said copy sets. The data may represent one or more pages of data. The term "copy job" is used in its conventional sense and implies operation of the apparatus in a copier mode to produce one or more hard copy sets from a job requiring copying of an original document having one or more hard copy pages in accordance with predetermined parameters requested for producing said copy sets.

A typical job represents a request to either print or copy a page or a sequence of pages. Where it represents a sequence of pages, the pages will be collated as a group or output finished such as by stapling.

In known copier/printer reproduction apparatus, a problem is associated with management of the copier and printer functions since only one marking engine is available for reproducing the information on the copy sheets. More specifically, a job image buffer memory is available as an interface to a writer for storing in rasterized form the information to be printed or copied. The buffer may, for example, have a capacity for storing image data for printing or copying about 50 pages. While this is more than enough necessary for most reproduction job, at times there are jobs that require about this amount of memory or more. It would also be desirable to allow for interruption of print jobs in progress to allow access to the apparatus for reproduction of a copy job. In order to provide for such interrupts, an apparatus might provide for one print job to be sent to the job image buffer at a time. Upon an interrupt, an original document may be scanned in and copied. However, operation of the printer/copier in this manner as will be shown, limits the productivity thereof.

It is therefore an objective of the invention to provide a copier/printer apparatus with improved productivity.

SUMMARY OF THE INVENTION

In accordance with one aspect of the invention, there is provided a copier/printer reproduction apparatus, comprises scanning means for scanning document originals containing visible image information to be reproduced and generating first signals representing the image information of a copy job; second input means for inputting electronic image information in the form of second signals for production of an image as a print job; buffer means responsive respectively to either said first and said second signals for storing respective third signals and fourth signals representing respectively the information on said document originals and said electronic image information; means for creating an interrupt operation for allowing said scanning means to be operative for scanning document originals while a current production job from said second input means is incomplete; a marking engine means for producing hard copies in response respectively either to said third signals and fourth signals; and control means, responsive to a time of day or other criteria of operation such as backlog or coding of a print job for inhibiting operation of the interrupt operation while allowing the marking engine to produce hard copies of print jobs from said second input means.

In accordance with another aspect of the invention, a copier/printer reproduction apparatus comprises scanning means for scanning document originals containing visible image information to be reproduced and generating first signals representing the image information of a copy job; second input means for inputting electronic image information in the form of second signals for production of an image as a print job; buffer means responsive to said first or second signals for storing third signals and fourth signals representing respectively the information on said document originals or said electronic image information; setup means operative during production of a current print job for entering setup parameters for a copy job; marking engine means for producing copy in response respectively to either of said third signals and fourth signals; and control means, responsive to a time of day or a parameter representing backlog of print jobs or coding of a print job for generating a signal inhibiting operation of the setup means while allowing the marking engine to produce copy of print jobs from said second input means.

BRIEF DESCRIPTION OF THE DRAWINGS

In the detailed description of the preferred embodiments of the invention presented below, reference is made to the accompanying drawings in which:

FIGS. 4A–4K are various screen displays generated in an operator control panel of the apparatus that are useful in the method and apparatus of the invention.

DETAILED DESCRIPTION OF THE PREFERRED EMBODIMENTS

The present description will be directed in particular to elements forming part of, or cooperating more directly with, apparatus in accordance with the present invention. It is to be understood that elements not specifically shown or described may take various forms well known to those skilled in the art.

Figure 1:
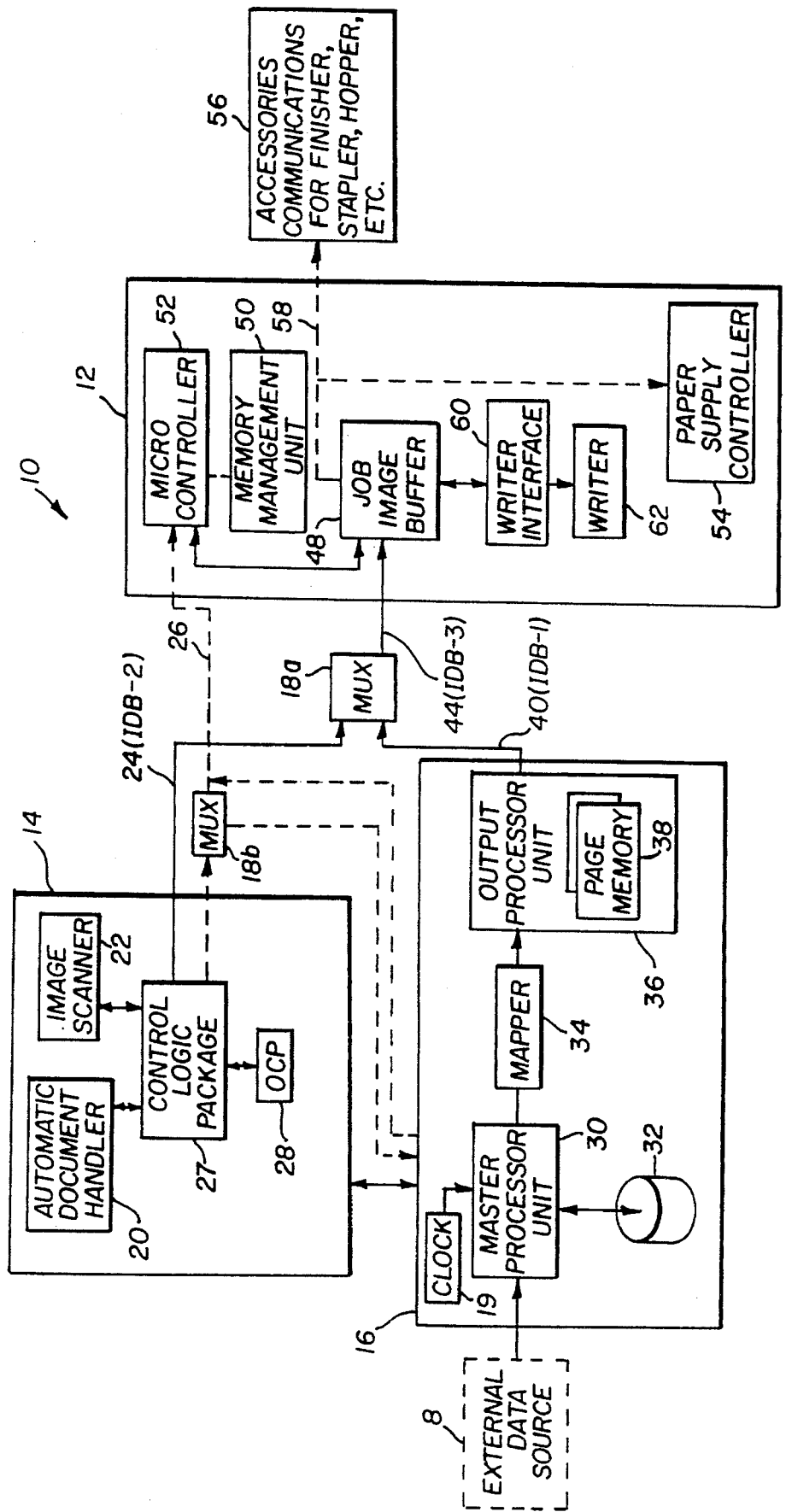
FIG. 1 is a schematic block diagram of one embodiment of copier/printer reproduction apparatus programmed in accordance with the invention.
Figure 2:
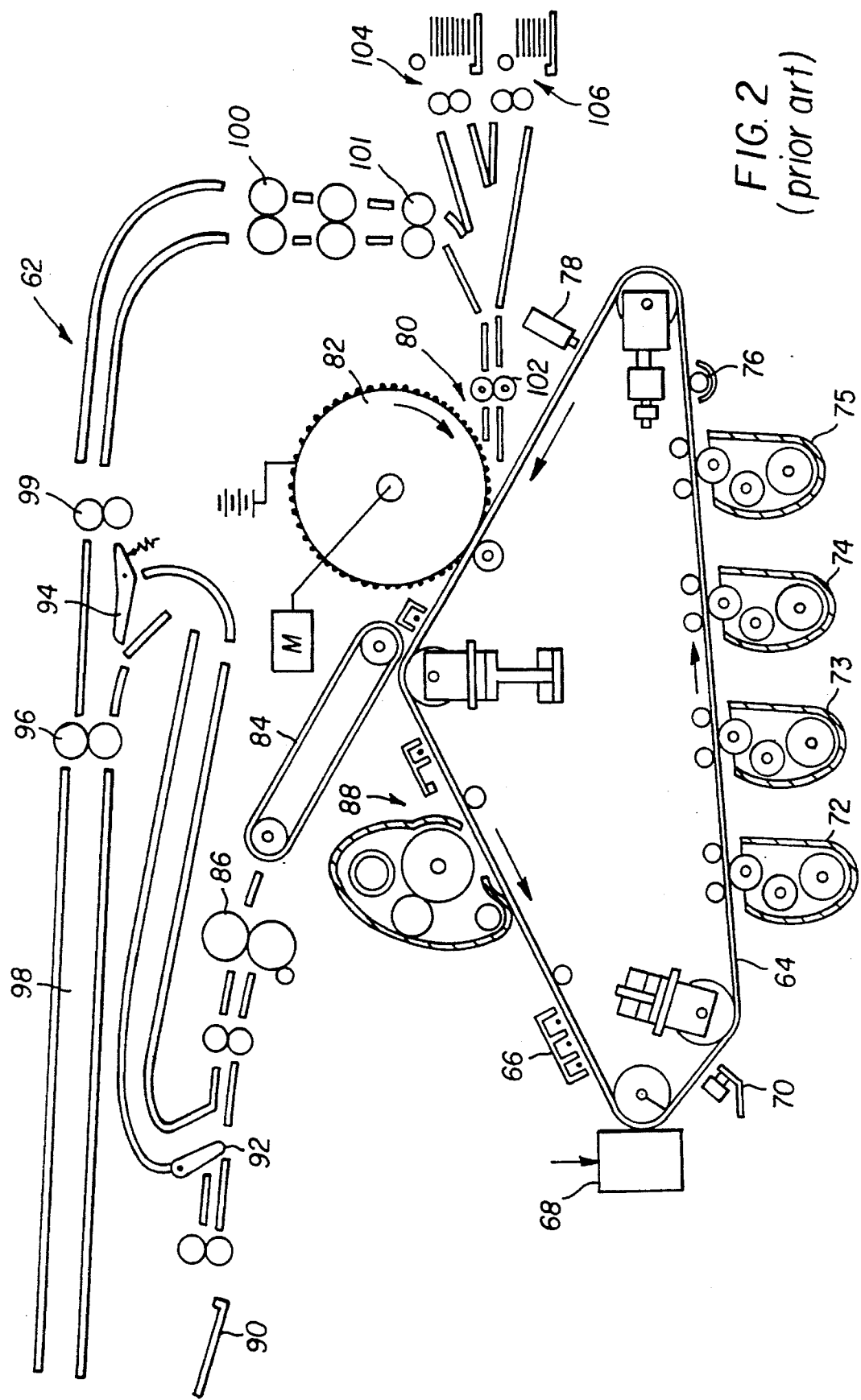
FIG. 2 is a diagram of a multi-color electrostatographic writer of the prior art but forming a part of the apparatus of the invention.
Figure 3A:
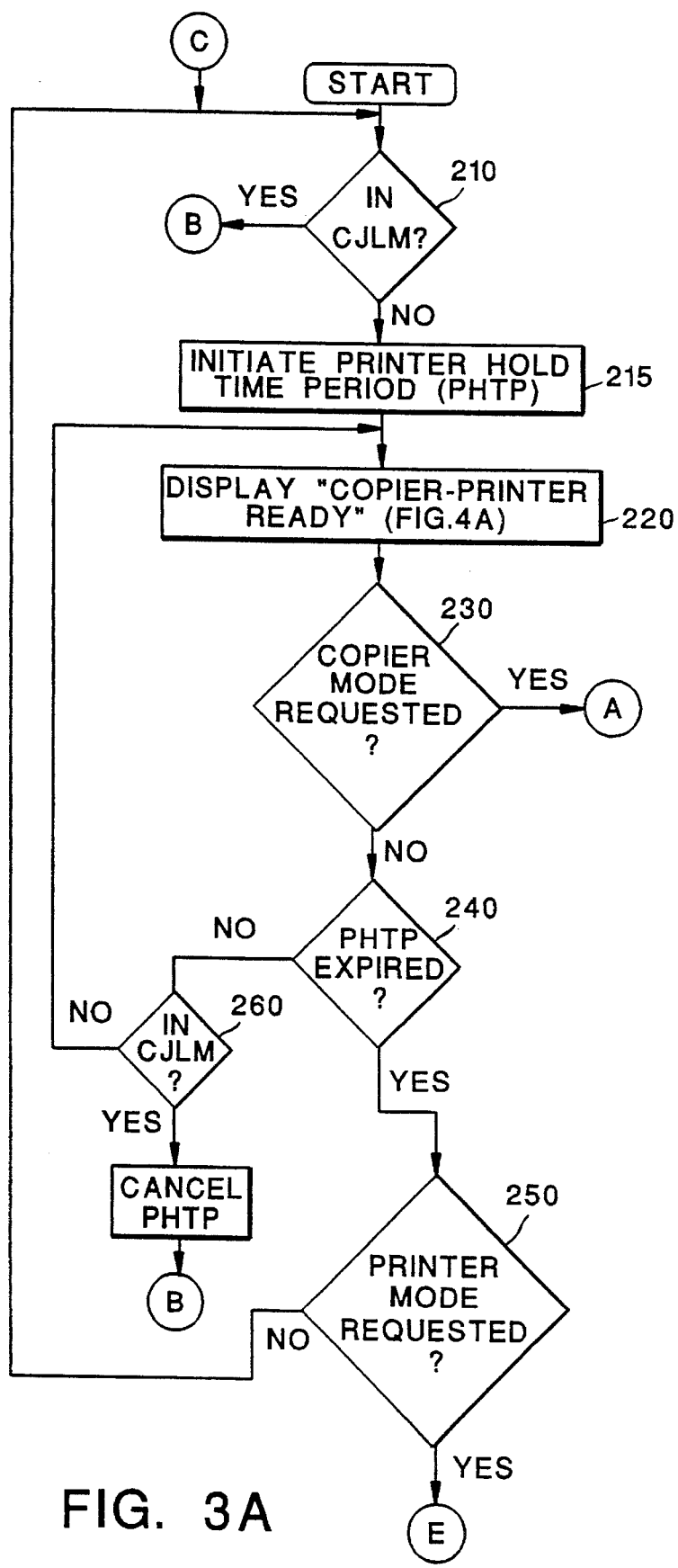
FIGS. 3A–3F provide a flowchart illustrating operation of various modes of the copier/printer apparatus in accordance with the invention.
Figure 3B:
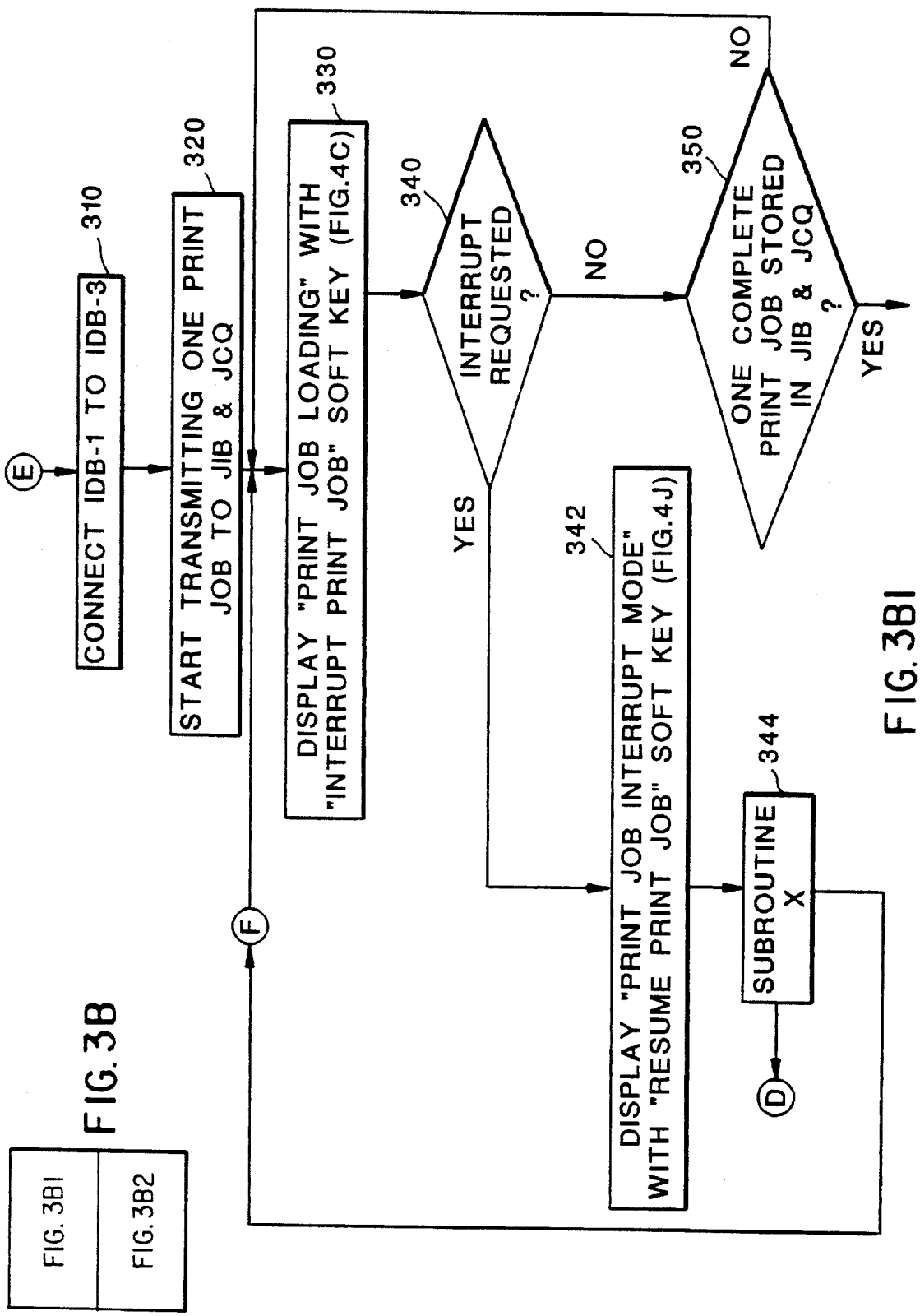
Figure 3C:
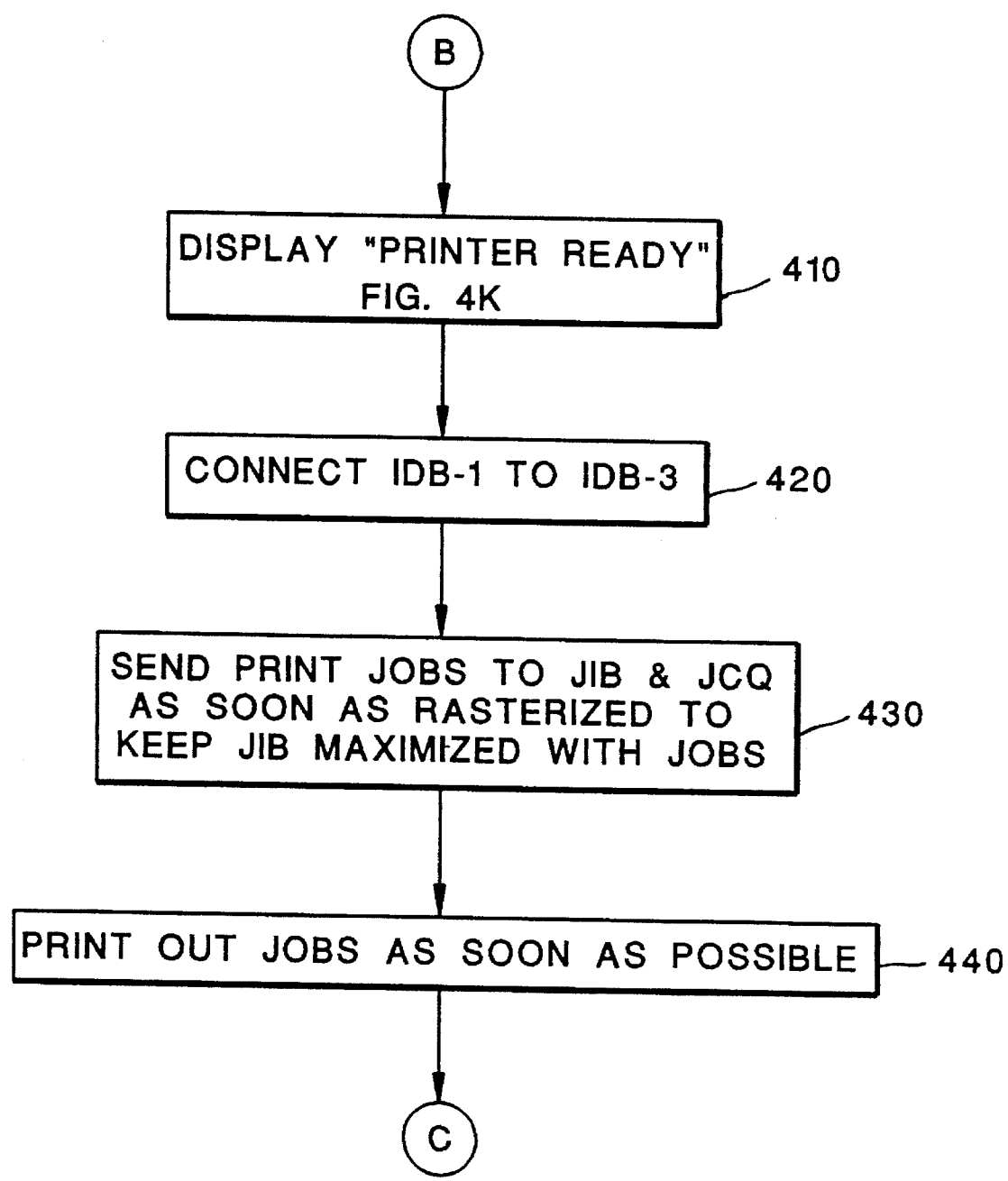
Figure 3D:
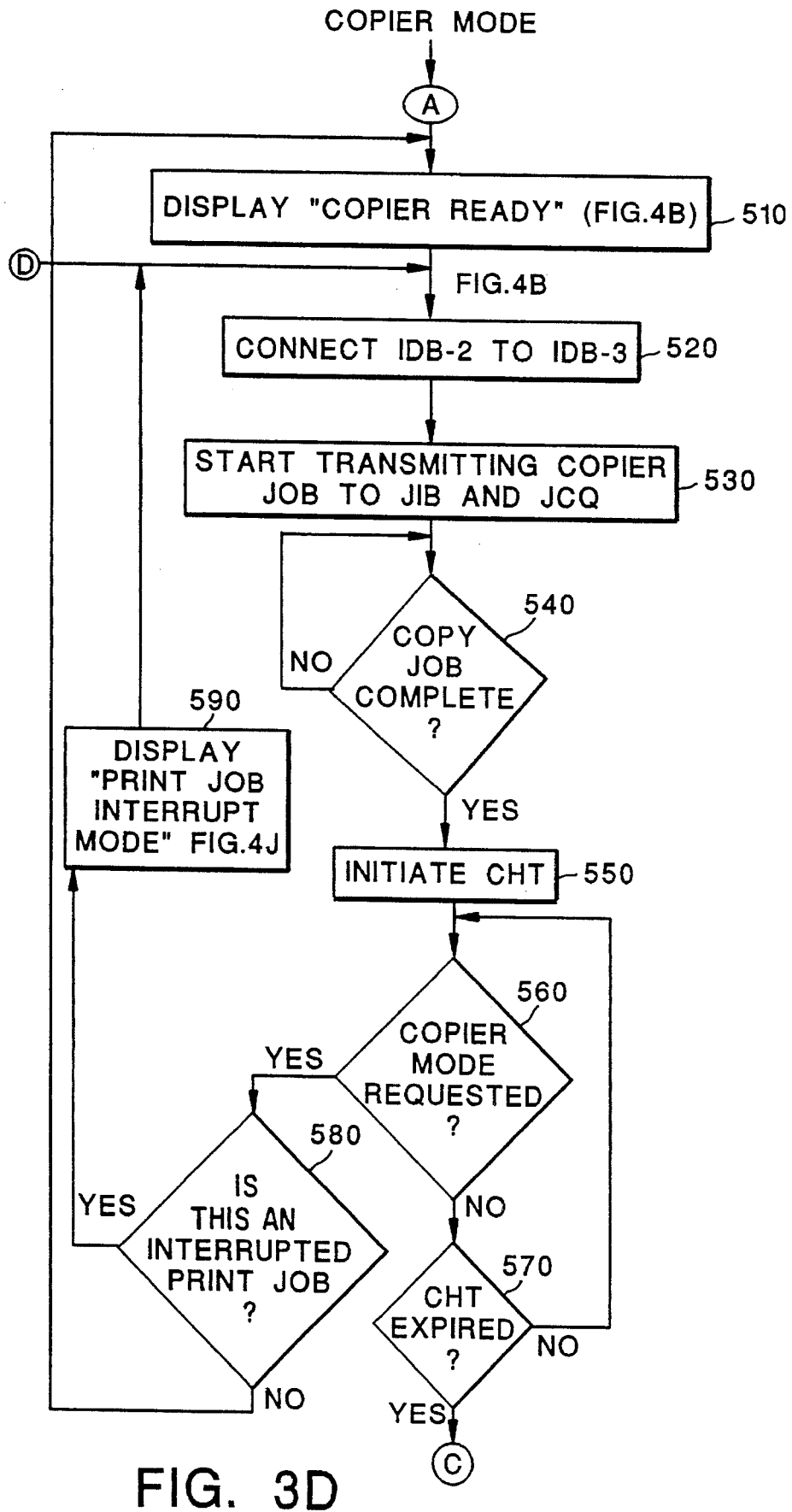
Figure 3E:
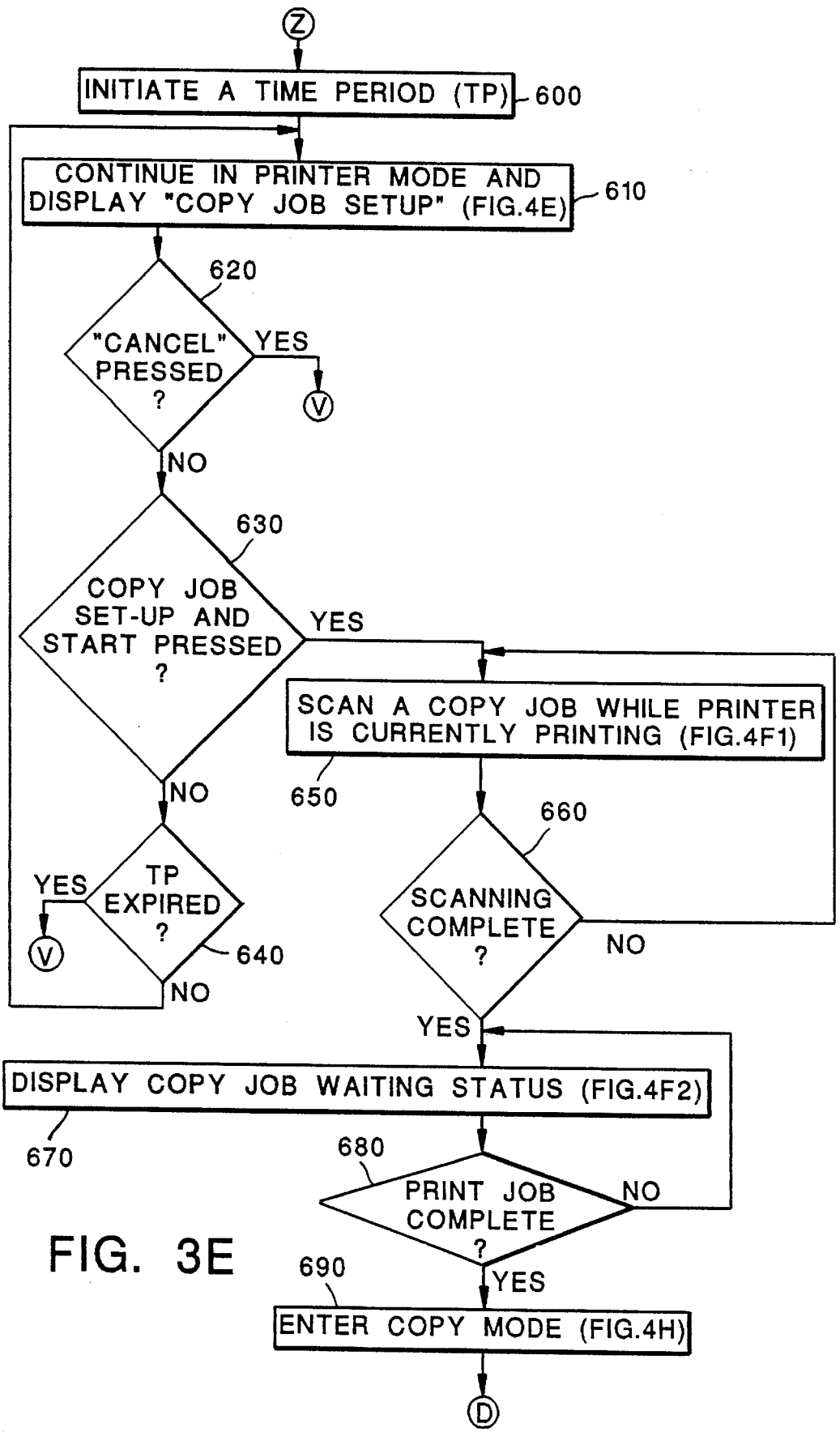
Figure 3F:
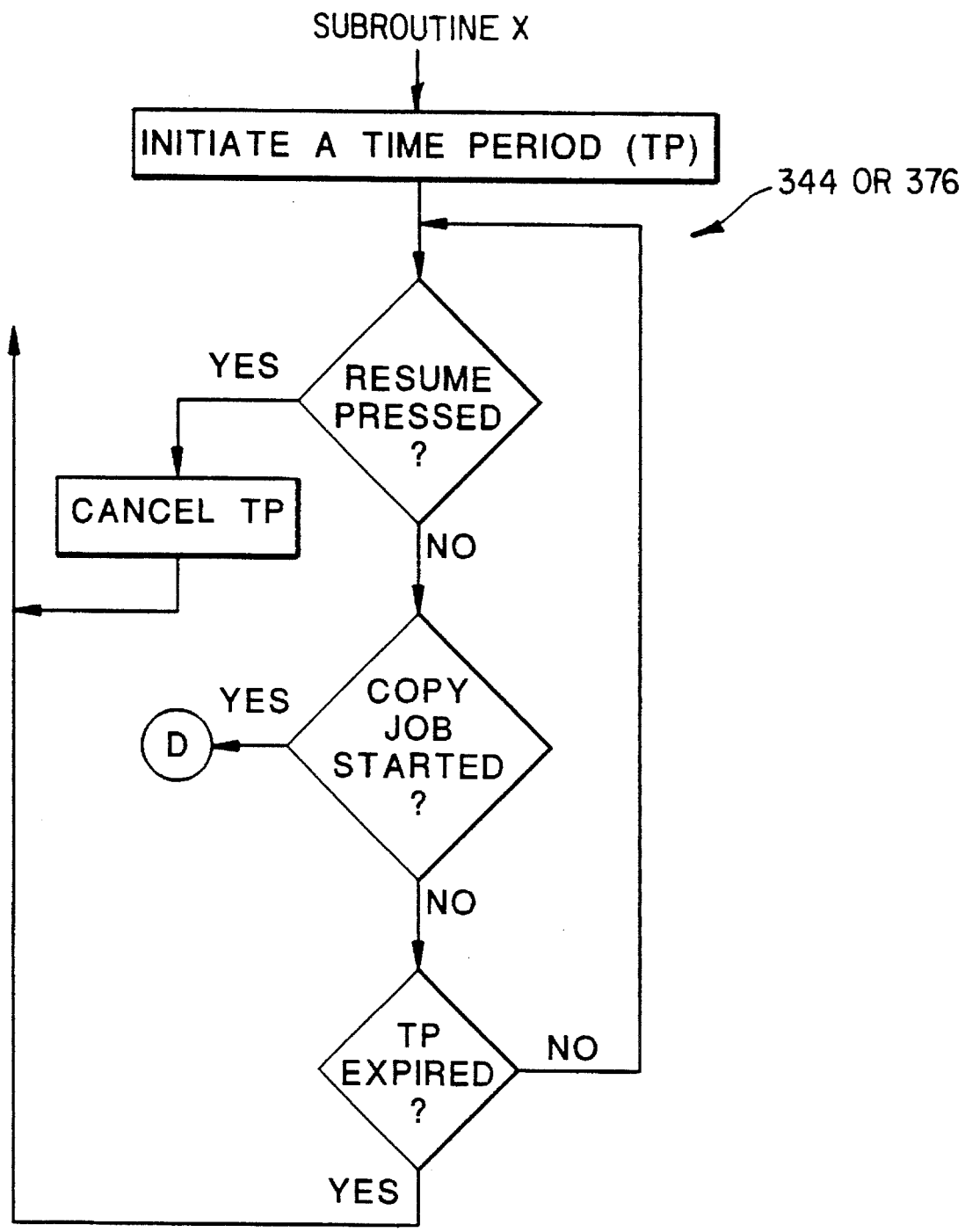

According to FIGS. 1 and 2, copier/printer reproduction apparatus 10 includes a marking engine 12, a scanner 14, a raster image processor (RIP) 16, and multiplexers 18a and 18b, for selecting or multiplexing respective inputs to the marking engine 12.

An original document reader such as scanner 14 is arranged for producing a series of electrical signals representative of the image content of original document sheets. Scanner 14 consists of an automatic document handler 20 for stream feeding in serial fashion hard copy original pages to a platen or scanning station to be automatically read by an image scanner 22 such as a linear array of solid state charge-coupled devices. In lieu of feeding document sheets to the platen, documents such as books or sheets may be placed on the platen. The solid state device scans the original pages, converting their images to a series of electrical signals in page format for input to a buffer memory forming part of the image scanner 22. In response to a signal from the RIP 16 to the multiplexer 18a, the image data and signals identifying separate scan lines are transmitted along an image data bus 24 (IDB-2) to the marking engine 12 via multiplexer 18a. Signals representing coded messages and providing page information and other marking engine control information identifying requirements for the job are transmitted along a job control communications link 26 to the marking engine 12. When the RIP 16 is operative, a multiplexer 18b causes these messages to be sent to the RIP and then from the RIP to the marking engine. When the RIP is non-operating, messages form the scanner are sent via the multiplexer 18b directly to the marking engine 12.

Scanner 14 includes a control logic package 27 having an operator control panel (OCP) 28 for the operator to input functions using keys and a display to allow the operator to receive messages from the reproduction apparatus. Setup instructions for a copy job are input by the operator using the OCP and interpreted by the control logic package which then sends coded messages via link 26 for finishing and processing to the marking engine 12. The logic package consists of control software, interface software and logic and computer hardware including memory. Functions inputted by the operator at the control panel provide for operation of the apparatus in various copying modes well known in the prior art to perform various copying jobs in accordance with the inputted parameters for each copy job. Such functions might include simplex or duplex copying, magnification or reduction number of copies, image editing, etc.

Raster image processor 16 includes a master processor unit 30 which receives high level commands and data in character code or other form from an external electronic data source 8 which may be one or more of a main frame computer, network link, data processing work station, removable memory media, or the like. The commands are translated into machine control language by the master processing unit 30. A job buffer 32 stores incoming jobs and program codes for use by the master processing unit.

After interpreting a job, master processing unit 30 parcels the job to a mapper 34, which converts the character code data to a pixel pattern map. For color prints, the mapper separates the information into four raster patterns, one for each color available at marking engine 12.

When the pixel pattern map is rasterized, mapper 34 sends page information to an output processor unit 36. The output processor unit has page memory 38, which stores image planes for transmission to the marking engine 12.

The processed image data and signals identifying separate raster lines are transmitted along an image data bus 40 to multiplexer 18a. Signals representing coded messages that provide page information and other marking engine control information are transmitted along the job control communications link 26.

The marking engine 12 receives bit stream image data over a bus 44 and job control data over the communications link 26. The image data is stored in a multiple page buffer memory 48 under the control of a memory management unit 50.

Control means, including a micro controller 52 having one or more microprocessors, is arranged to perform arithmetic and logic operations and instruction decoding for operation of the marking engine 12 as well as controlling the time allocation of peripherals (such as a paper supply controller 54 and accessories 56) through a machine control communications link 58. Several output functions may be available for receiver sheets, including selection of output trays, stapling, sorting, folding, finishing, mailbox, envelope receiver, etc. Programing of a number of commercially available microprocessors is a conventional skill well understood in the art. This disclosure is written to enable a programmer having ordinary skill in the art to produce an appropriate control program for the microprocessor(s). The particular details of any such program would, of course, depend on the architecture of the designated microprocessor.

After appropriate processing, the data is input to a writer interface 60 and an LED writer 62 for forming images on receiver sheets.

According to FIG. 2, the LED writer 62 of marking engine 12 includes an image bearing member, for example, either a drum or preferably an endless electrophotoconductive web 64 entrained about a series of primary rollers and other supporting structure. Web 64 is driven by a motor driven roller through a series of electrophotographic stations generally well known in the art. More specifically, a uniform charge is laid down on the web by a charging station 66. The uniformly charged web moves around one of the rollers, which is directly opposite an LED printhead 68 which LED printhead selectively image-wise exposes web 64 in a manner well known in the art to form an electrostatic latent image. The web then moves into operative relation with an electrometer 70 which senses the level of a charge existing after exposure of the web by printhead 68, to help control the process.

The web then moves into operative relation with a series of toning or developing stations 72, 73, 74 and 75. Each image created by printhead 68 is toned by one of the toning stations. After being toned, the web passes a magnetic scavenger 76 which removes excess iron particles picked up in the toning process. After the electrostatic image has been toned, the web passes under densitometer 78 which measures the density of the toner image also for use in controlling the process. The toner image then proceeds to a transfer station 80 where the image is transferred to a transfer surface of a receiver sheet carried by a transfer drum 82.

As thoroughly discussed in U.S. Pat. No. 4,712,906, consecutive images in different colors are transferred in registry to a receiver sheet. The receiver sheet is wrapped on transfer drum 82 and recirculated on the surface of the drum into transfer relation with the consecutive images to create a multicolor image on the sheets. To improve efficiency, large sheets, for example, "ledger" size sheets are placed on the drum with the small dimension parallel to the axis of the drum and wrapped substantially around the transfer drum. Small sheets, for example, "letter" size sheets are placed with their long dimension parallel to the axis of the drum.

Since the short dimension of letter size sheets is approximately half the long dimension of ledger size sheets, two letter size sheets are placed on the drum in approximately the same space as the single ledger size sheet. When the apparatus is operating in a multi-image mode, for example, a multi-color mode, consecutive images or pairs of images are toned with different colored toners using the different toning stations 72–75. These consecutive images are transferred in register to the receiver sheet as it repeatedly is brought into transfer relation with web 64 by drum 82. After the transfer operation is complete, the receiver sheet is allowed to follow the web, for example, by removing the vacuum holding it to drum 82 or by stripping the sheet with a skive, or other conventional stripping mechanism or both. The receiver sheet is separated from the web with the aid of an electrostatic sheet transport mechanism 84 and is transported to a fuser 86. The web is then cleaned by the application of a neutralizing corona and a neutralizing erase lamp and a magnetic brush cleaning mechanism all located at a cleaning station 88.

After the receiver sheet leaves fuser 86 it can go directly to an output tray 90 or be deflected by a deflector 92 into a duplex path according to the position of deflector 92, the position of which is controlled by the logic of the apparatus through means not shown. The duplex path moves the sheet by rollers and guides directing it first through a passive deflector 94 into turn-around rollers 96. Turn-around rollers 96 are independently driven to drive the receiver sheet into turn-around guide means 98, until the trailing edge thereof has been sensed by an appropriate sensor, not shown, to have passed passive deflector 94. Once the trailing edge has passed passive deflector 94, turn-around rollers 96 are reversed and the receiver sheet is driven by rollers 96 and other sets of drive rollers 99, 100, and 101 back to a position upstream of transfer station 80. The receiver sheet can pass through registration mechanism for correcting for skew, cross track misalignment and in-track misalignment and ultimately stop at timing rollers 102.

Transfer station 80 receives sheets from any of three sources. First, it can receive sheets of one particular size from a first supply 104, which first supply may include, for example, letter size sheets being fed with their short dimension parallel with the direction of feed. Second, it may receive sheets from a second supply, 106, which, for example, may include ledger size sheets with their long dimension parallel to the direction of movement. Third, the transfer station may receive sheets from the duplex path which may include either size sheet and would already contain a fused image on its upper side. The receiver sheets from whatever source, stop against timing rollers 102. In response to a signal from the logic and control of the apparatus, not shown, timing rollers 102 accelerate to drive the receiver sheet into the nip between the transfer drum 82 and the web as the first toner image to be transferred approaches the nip.

The duplex path is of a length that takes multiple sheets at one time depending on the length of the sheets. For example, four letter size sheets may be in the duplex path at one time or two ledger size sheets. If the printer is printing different images on different sheets, the logic and control of the apparatus must supply the necessary programming to the exposure and toning stations so that the sheets ultimately fed to output tray 90 are in the correct order considering the number of sheets that must be in the duplex path.

In operation of the copier mode, control logic package 27 starts in a sub-routine pre-programmed according to the switches on control panel 28 to command scanner 14 to begin operation. Automatic document handler 20 is activated to move seriatim document sheets into an exposure station of image scanner 22.

As the scanning of the document sheets progresses, data (including image information and control signals) are received by job image buffer 48. As subsequent original document sheets are scanned, the processes described above are repeated until all of the original document sheets have been scanned and the data therefrom stored in job image buffer 48.

One function of a multiple-page image buffer 48 is to store all the pages of a particular job so that plural sets of collated pages may be produced without re-scanning the set of originals for each set produced. Thus, data for each page in a copy set to be printed is sent to the writer interface 60 and, after the copy set is printed, data for each page in a second copy set is sent to the writer interface. Thus collated copy sets can be printed even without use of a sorter. As such, automatic document handler 20 need not be capable of recirculating the originals.

In a standard "copying" mode of operation, the latent images imaged by the LED printhead are aligned on web 64 such as to allow an orderly repetitive process of exposure and transfer to receiver sheets. Documents are sequentially imaged onto the photoconductive surface with consistent reference to frame marks on the web.

The inventors have recognized that the use of the copier mode for the copier/printer apparatus is best utilized when substantially restricted to normal working hours; i.e., say 7 AM to 6 PM and that many of the print jobs may be deferrable to hours other than normal working hours. With this in mind, the invention provides the copier/printer apparatus with a programmable clock 19 wherein a key operator may define a time period; i.e., for example between 6 PM to 7 AM, wherein the copier/printer is locked out of operation in the copying mode. This mode of printer operation is referred to herein as copy-job lockout mode or CJLM. In CJLM, the printer's raster image processor (RIP) 16 is sending rasterized image data to the JIB 48 as continuously as the JIB has memory capacity to accept same without being limited to sending just one job. Thus, multiple print jobs are sent to the JIB in the CJLM mode of operation. Compare this with the normal print mode of operation wherein one print job is sent to the JIB at a time. The RIP 16 when it fills up with data in page memory 38 must place on hold any further mapping of data in mapper 34 while the apparatus provides some available memory space in JIB 48 for storing any copy job requests that may come in via say a job interrupt.

The specific details of operation may be described from the flowchart of FIGS. 3A–3F, as well as the operating screens on the OCP 28, which prompt the users through the various steps of operation. Reference will now be made to the flowchart steps illustrated in FIGS. 3A–3F and the OCP display screen prompts illustrated in FIGS. 4A–K in describing the various modes associated with the invention.

Assume that clock 19 is associated with the RIP's master processor unit 30 and that this processor is programmed to allow a key operator to designate begin and end times of operation of the copier/printer apparatus in the CJLM print mode of operation. In response to a commencement of this mode, inputs from the copier OCP 28 are either ignored or a timed message of say 5 seconds duration may be displayed that states "Copier disabled. Call Key Operator to enable." accompanied by an auditory message or "beep" being generated. Soft keys as well as hard keys are part of the OCP and its display, and indeed in this mode there are no indicated soft keys (see FIG. 4K) that provide a prompt for any type of walk-up user intervention. As is well known, soft keys are keys or parts of a screen display whose identified functions are changed on the display in accordance with programmed operation rather than having a fixed identified function(s). The key and its function may be incorporated on the display as a touch screen or the key itself may be separate and its function displayed on the display.

As noted from FIG. 1, the copier/printer's control logic package 27 is coupled to the copier's operator control panel (OCP) 28 and the printer's RIP 16. In addition, the control logic, which may include one or more microprocessor-based microcomputers also includes or is connected to the programmable clock 19 on the RIP that allows programming of hours when the copier/printer is in the CJLM printer mode of operation. Typically, during normal working hours, say 7 AM to 6 PM, the CJLM mode is not operative (decision blocks 210, 260) and the OCP's screen illustrated in FIG. 4A is displayed to the walk-up user (step 220). This screen is generated in response to a signal from the document handler 20 and the RIP 16 to the control logic in the RIP's master processor unit 30 that the RIP 16 and the document handler 20 are both in an idle state. In response to the copier/printer no longer being in the CJLM mode, a printer hold time period may be initiated (step 215) to hold up any initiation of a printing operation for a programmable period of say 1–30 seconds to allow a walk-up user for a copying operation to initiate and have performed a copy job. During this time period, the RIP may be operative but not sending jobs to the JIB. This printer hold time period (step 215) may be eliminated in a transition in status from a CJLM mode to the copier-printer mode and introduced instead after a print job is completed (see step 390, FIG. 3b). In response to an input by a copier user on the OCP such as for setting up a copy job (see decision block 230), a copier mode will be initiated (see FIG. 3D). Print jobs from the external data source 8 that happen to enter the copier/printer via the RIP 16 will now be queued in the RIP. The copier/printer now being in a copier mode will have the screen display changed to that shown in FIG. 4B (see also step 510). In this mode, the copier/printer functions as a conventional copier and jobs are scanned in the scanner 14 using a feeder to circulate same and generate a rasterized signal of the image information on the documents. The scanned image data is stored in a page buffer that forms a part of image scanner 22 and upon connection of image data bus-2 (24) to image data bus-3 (44) by multiplexer 18a the image data is transferred to JIB 48 (step 520). Also transferred to the microcontroller 52 or job control queue (JCQ) are job control data (step 530). In JIB 48, the scanned image information data is compressed, stored in the JIB's memory and then expanded when the frame to be printed is in a position synchronized with the data for sending the data to writer 62 for recording same on the charged photoconductive web 64 by selectively enabling LEDs on the LED printhead. Further details relative to the JIB are described above and in international published application WO 90/07753, the contents of which are incorporated herein by this reference.

Upon completion of the copier job (decision block 540) a time period (CHT) is initiated (step 550) to hold the apparatus in the copier mode to allow a user time to commence set-up of the apparatus for a next copy job. The copier hold time (CHT) period is programmable by the key operator and may last from say 1 second to 5 minutes, for example. If the copier mode is requested by set-up of inputs for a new copy job, prior to expiration of the CHT period, the steps 510–570 repeat. There is also a provision for retaining the copier mode in case of an interrupted print job (decision block 580) wherein a copy job has been made in the copier mode while the current print job is interrupted (see decision block 580 and step 590). In the event that no copier job has been entered within the predetermined CHT period (decision block 560) or after the copy hold time period following the completion of the copy job (decision block 570), the display of FIG. 4A returns (step 220). In instances where the RIP 16 is no longer idle and thus the printer mode is requested (decision block 250) image data bus IDB-1 is connected to IDB-3 (step 310) and the RIP starts transmitting one print job to the JIB and the JCQ (step 320). The OCP display displays information of FIG. 4C that the print job is loading and provides a soft key message display indicating that the soft key below the message is activated to allow a walk-up user to interrupt the print job to run a copy job (step 330). Recall that in this printer mode, only one print job (see decision block 350) is stored in the JIB 48 to allow room for a copy job that may come in during an interrupt through decision blocks 340 and 370 or after a print job is completed (decision block 390).

Figure 4H:
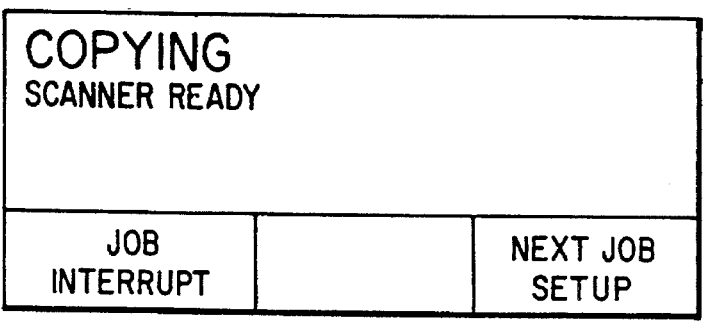

When the print job is currently printing, the display displays the information of FIG. 4D (step 360). This screen display indicates the current status of the job being printed and the estimated time remaining for completion of the printing job. In addition, additional soft keys are indicated as being available to allow the current print job to be interrupted or a copy job to be setup while the current print job is printing. When the copy job setup soft key is pressed (step 380), a time period (TP, step 600) is initiated to allow the operator time to enter parameters for this copy job and to start a scanning operation for scanning the document sheets of the copy job into buffer memory. The information of display FIG. 4E is now displayed (step 610) indicating that the walk-up user for the copier may set up the copying parameters for the copy job while the printer continues to print the current printing job. A 'cancel copy job' soft key and 'reset setup' soft key are also displayed. If the former soft key is pressed (decision block 620), the current setup features selected for this copy job are deselected. The 'cancel copy job' soft key will allow the user to go back to the display of FIG. 4D. Alternatively, if a new copy job has not been started by pressing the start button within the required time period, the display of FIG. 4D will be called-up and displayed (decision block 640). In the event that the start button is pressed during display of the display of FIG. 4E (decision block 630), the display of FIG. 4F1 is now called up (step 650) and scanning of a document job by operation of the document feeder commences while printing of the current print job continues. When scanning of this copy job is complete (decision block 660) the image data for this job is stored in the JIB 48 which also stores the image data for the current print job being printed. The display of FIG. 4F2 is now displayed (step 670) which provides a soft key allowing the walk-up user to review the copy job's setup which is the job now waiting to be copied upon completion of printing of the current print job. Pressing this soft key provides the display of FIG. 4G and allows the operator to make job level changes for this copy job. Two new soft keys are indicated to be available in FIG. 4G to either save changes for this copy job or to indicate that there are no changes to this copy job. Pressing either soft key returns the display to that of FIG. 4F2. When the print job is complete (decision block 680), the copy job that has been entered is begun (step 690) and the copier is in a copy mode (see FIG. 3D) and displays the display of FIG. 4H.

Figure 4I:
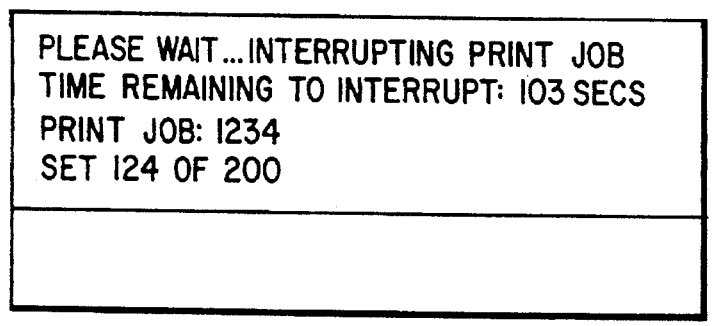
Figure 4J:
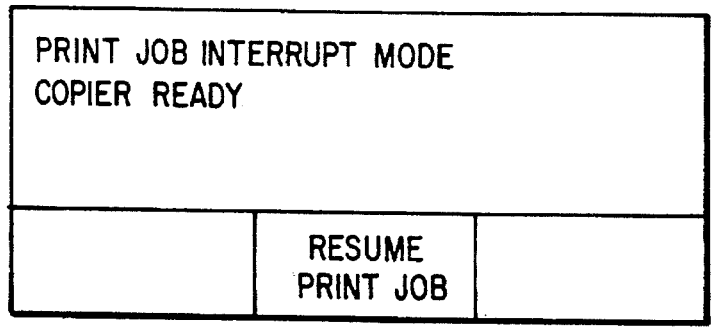

In lieu of waiting for the current printer job to be over before the copier/printer is returned to its copier mode, a print job may be interrupted by pressing the 'interrupt print job' soft key associated with the display of FIG. 4D (step 360). In response to pressing of the interrupt soft key (decision block 370), the display of FIG. 4I is called up and displayed (step 372) and will continue until the current set of the interrupted print job is completed. Upon completion of the current set, the print job interrupt mode is established and the copier/printer is ready for the walk-up user to perform a copy job and such is indicated in the display of FIG. 4J which is now displayed (step 374). A timer subroutine (see FIG. 3F) begins timing of the idle state of the copier/printer (subroutine X, step 376). The timer may be programmable from say 0 to several minutes or can be a fixed time of say 5 minutes and is established by setting of the key operator. Pressing "INTERRUPT PRINT JOB" when FIG. 4C is displayed will cause display of FIG. 4J (steps 342, 344) to be displayed almost immediately. This is because printing of the print job has not yet begun so a delay is not needed to finish the current set.

Figure 4K:
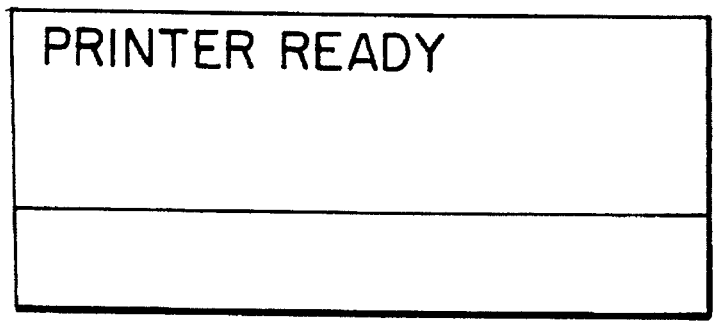

As the copier/printer performs its functions during the pre-programmed hours of the normal work day, the RIP sends only one print job at a time to JIB 48 to leave room therein for any walk-up copying jobs. However, after the normal workday is over as determined by the programmed clock 19, higher productivity is obtained in say the evening and early morning hours by eliminating access to the copier function to the walk-up user through elimination of any soft keys or other available keys that otherwise are available during the normal working hours. The display in the copy job lock-out mode is illustrated in FIG. 4K (step 410) and as can be seen, no soft keys are displayed for interrupting a print job or allowing for set-up of a copy job while in the CJLM mode. Thus, in the CJLM mode, print jobs are sent to the RIP as they are rasterized (steps 430, 440) via the connection of IDB-1 and IDB-3 (step 420), and increased productivity results since no additional skipped frames are required by the marking engine in waiting for the next print job to be sent from the RIP to the JIB and then to the marking engine.

In its broader aspects, the invention is not limited to storing only one print job in a buffer to allow room for copy jobs to be input. Generally, in accordance with the teachings of the invention, plural print jobs, say a defined positive number N (or as described herein an undefined number N, depending upon available buffer capacity at the time) are the maximum number stored in the CJLM print mode. In the interruptable printer mode fewer print jobs are stored, say M wherein 1≦M<N. In addition, in its broader aspects, the invention is not limited to time of day being the criterion for creating the copy job lockout mode. In lieu of time of day, the criterion may be the amount of backlog of print jobs either by comparing the number of print jobs or memory amount taken up in the backlog with a programmed count or amount or by calculating a time equivalent to work off the backlog and comparing same with a programmed time to initiate a CJLM print mode when this threshold is reached. In addition, the program may use combinations of these criteria to determine when to initiate the CJLM.

Further modifications may include allowance of some limited interrupt capability by a walk-up user for making copies, wherein when the printer is in its CJLM print mode and an interrupt button is pressed, the microcontroller 52 determines when sufficient memory is available in the JIB 48 for say one or only a few pages of a scanned-in document sheet. The RIP 16 is commanded to hold up sending further jobs to the JIB until this one copy job is done. A display may be provided to inform the walkup user that the printer is only available for a limited type interrupt and that scanning of the copy job will be delayed for say a specified time quantified from an estimate to complete a current print job. The copier/printer may be programmed to analyze the times and frequencies of such limited interrupt requests and adaptively control the copier/printer to determine the times of day for setting the beginning and end of the CJLM print mode; in this regard, see U.S. Pat. No. 5,194,895. Still other modifications may including providing controls to allow a key operator to lock-out all low priority print jobs during certain hours when high copier usage is anticipated. Even with the copier/printer being effectively in a print job lock-out mode, provision may be made through logic in the operating program or logic circuitry to allow a signal from the RIP on receiving a print job with a high priority code or a high security code or other type of code forming a ranking code to cause the copier/printer status to revert to the copy job lock-out mode either immediately, where no copy job is in progress, or after completion of the set being worked on. In the event that the copier/printer is operational and in the copier mode, the high priority print job may even cause the copier hold time period (step 550) to be cancelled and the status of the machine changed to the copy job lock-out mode for handling the high priority print job.

While the invention is disclosed with reference to a particular electrophotographic apparatus, other electrostatographic printing apparatus may be used therewith and indeed other types of printers such as ink jet, thermal and photographic will also find the invention useful.

The invention has been described in detail with particular reference to preferred embodiments thereof and illustrative examples, but it will be understood that variations and modifications can be effected within the spirit and scope of the invention.

We claim:

1. Electrophotographic reproduction apparatus, said apparatus comprising:

an electrophotoconductive recording medium;

scanning means operating in a copier job mode for scanning document originals of a copy job containing visible image information to be reproduced and generating first image data signals representing the visible image information;

raster image processing means operating in a printer mode for processing print jobs of electronic image data from a computer and for rasterizing said electronic image data and generating second image data signals representing said electronic image data in rasterized form;

buffer means for storing third signals and fourth signals representing respectively the image information on said document originals and the electronic image data from said computer;

first means responsive to each of said third signals and said fourth signals for modulating charge on said medium and for forming respective images represented by said third and fourth signals;

and second means cooperating with said medium for recording the images on receiver sheets; and control means for controlling image data to said buffer means, said control means operating in a first printer mode wherein said second data signals are transmitted to said buffer means, said first printer mode being subject to an interrupt operation for a copy job wherein said scanning means are operational to scan document originals of a copy job so that said first data signals are transmitted to said buffer means and said first and second means are responsive to third signals representing image data from document originals that are scanned to produce a copy in accordance with information on the document originals in said copy job, and said control means operating in a second printer mode that is responsive to a signal representing a time of day wherein in said second printer mode signals from said raster image processing means and representing image data cannot be subject to said interrupt operation for a copy job.

2. The apparatus of claim 1 and wherein in said first printer mode said control means controls image data to said buffer means from said raster image processing means and allows signals representing image data for only one job from said raster image processing means to be stored in said buffer means to provide room in said buffer means for image data during an interrupt operation for a copy job.

3. The apparatus of claim 2 and wherein in said second printer mode said control means controls image data from said raster image processing means and allows signals representing image data for plural print jobs from said raster image processing means to be stored in said buffer means.

4. The apparatus of claim 3 and including a programmable display means for displaying indicia for a key function, the display displaying indicia for an interrupt option during said first printer mode but not during said second printer mode.

5. The apparatus of claim 4 and wherein said key function is part of a soft key.

6. The apparatus of claim 4 and wherein a key and said function are displayed on a touch screen.

7. A copier/printer reproduction apparatus, said apparatus comprising:

scanning means for scanning document originals containing visible image information to be reproduced and generating first signals representing the image information of a copy job;

second input means for inputting electronic image information in the form of second signals for production of an image as a print job;

buffer means responsive respectively to either said first and said second signals for storing respective third signals and fourth signals representing respectively the information on said document originals and said electronic image information;

means for creating an interrupt operation for allowing said scanning means to be operative for scanning document originals while a current production job from said second input means is incomplete;

a marking engine means for producing hard copies in response respectively either to said third signals and fourth signals; and control means, responsive to a time of day, for inhibiting operation of the interrupt operation during a predetermined segment of a day while allowing the marking engine to produce hard copies of print jobs from said second input means.

8. The apparatus of claim 7 and including a display, said control means inhibiting display of a key function for initiating an interrupt operation during said predetermined segment.

9. The apparatus of claim 8 and wherein said key is a soft key whose function is displayed on said display.

10. The apparatus of claim 8 and wherein said display is a touch screen and said key is displayed on said display.

11. The apparatus of claim 7 and wherein said marking engine is an electrophotographic marking engine.

12. The apparatus of claim 7 and wherein said control means controls operation of said apparatus in a first mode wherein in said first mode said control means controls image information to said buffer means from said second input means and allows signals representing image information for only one job from said second input means to be stored in said buffer means to provide room in said buffer means for image information from said scanning means during an interrupt operation.

13. The apparatus of claim 12 and wherein said control means operates said apparatus in a second mode wherein in said second mode said control means controls image information from said second input means and allows signals representing image information for plural jobs from said second means to be stored in said buffer means.

14. The apparatus of claim 7 and wherein said control means controls operation of said apparatus in a first mode wherein in said first mode said control means controls image information to said buffer means from said second input means and allows signals representing image information for only M print jobs from said second input means to be stored in said buffer means to provide room in said buffer means for image information for a copy job during the interrupt operation and wherein said control means operates said apparatus in a second mode wherein in said second mode said control means controls image information from said second input means and allows signals representing image information for N print jobs from said second means to be stored in said buffer means wherein M and N are positive numbers and $1 \leq M < N$.

15. A copier/printer reproduction apparatus, said apparatus comprising:

scanning means for scanning document originals containing visible image information to be reproduced and generating first signals representing the image information of a copy job;

second input means for inputting electronic image information in the form of second signals for production of an image as a print job;

buffer means responsive to said first or second signals for storing third signals and fourth signals representing respectively the information on said document originals or said electronic image information;

setup means operative during production of a current print job for entering setup parameters for a copy job;

marking engine means for producing copy in response respectively to either of said third signals and fourth signals; and control means, responsive to a time of day, for generating a signal inhibiting operation of the setup means during a predetermined segment of a day while allowing the marking engine to produce copy of print jobs from said second input means.

16. The apparatus of claim 15 and including a display, said control means inhibiting display of a key function for initiating a copy job setup operation during said predetermined segment.

17. The apparatus of claim 16 and wherein said display is a touch screen and said key is displayed on said display.

18. The apparatus of claim 15 and wherein said control means controls operation of said apparatus in a first printer mode wherein in said first printer mode said control means controls image information to said buffer means from said second input means and allows signals representing image information for only one job from said second input means to be stored in said buffer means to provide room in said buffer means for image information from said scanning means.

19. The apparatus of claim 18 and wherein said control means controls operation of said apparatus in a second printer mode wherein in said second printer mode said control means controls image information from said second input means and allows signals representing image information for plural jobs from said second means to be stored in said buffer means.

20. The apparatus of claim 15 and wherein said control means controls operation of said apparatus in a first printer mode wherein in said first printer mode said control means controls image information to said buffer means from said second input means and allows signals representing image information for only M print jobs from said second input means to be stored in said buffer means to provide room in said buffer means for image information for a copy job and wherein said control means operates said apparatus in a second printer mode wherein in said second printer mode said control means controls image information from said second input means and allows signals representing image information for N print jobs from said second means to be stored in said buffer means wherein M and N are positive numbers and $1 \leq M < N$.

* * * * *